(12) United States Patent
Sudou

(10) Patent No.: US 10,133,388 B2
(45) Date of Patent: Nov. 20, 2018

(54) INPUT DEVICE

(75) Inventor: Tomohiro Sudou, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/984,197

(22) PCT Filed: Feb. 10, 2012

(86) PCT No.: PCT/JP2012/000909
§ 371 (c)(1),
(2), (4) Date: Aug. 7, 2013

(87) PCT Pub. No.: WO2012/108213
PCT Pub. Date: Aug. 16, 2012

(65) Prior Publication Data
US 2013/0307809 A1    Nov. 21, 2013

(30) Foreign Application Priority Data
Feb. 10, 2011   (JP) ................. 2011-027424

(51) Int. Cl.
| G06F 3/041 | (2006.01) |
| G06F 3/0488 | (2013.01) |
| G06F 3/01 | (2006.01) |
| H04M 1/725 | (2006.01) |

(52) U.S. Cl.
CPC ............ *G06F 3/0414* (2013.01); *G06F 3/016* (2013.01); *G06F 3/0488* (2013.01); *H04M 1/72519* (2013.01); *H04M 2250/22* (2013.01); *H04M 2250/60* (2013.01)

(58) Field of Classification Search
CPC ................................................ H04M 1/72544
USPC ........................... 345/173–183; 715/700–866
See application file for complete search history.

(56) References Cited

U.S. PATENT DOCUMENTS

| 6,765,559 B2* | 7/2004 | Hayakawa ..................... 345/173 |
| 6,919,927 B1 | 7/2005 | Hyodo |
| 8,448,083 B1* | 5/2013 | Migos et al. ................. 715/781 |
| 2006/0132457 A1* | 6/2006 | Rimas-Ribikauskas et al. .......... 345/173 |
| 2006/0284858 A1* | 12/2006 | Rekimoto ..................... 345/173 |
| 2007/0188473 A1* | 8/2007 | Anwar .......................... 345/173 |

(Continued)

FOREIGN PATENT DOCUMENTS

| JP | 11-053165 A | 2/1999 |
| JP | 11-355617 A | 12/1999 |

(Continued)

OTHER PUBLICATIONS

International Search Report; PCT/JP2012/000909; dated Mar. 19, 2012.

*Primary Examiner* — Roberto Flores
(74) *Attorney, Agent, or Firm* — Studebaker & Brackett PC

(57) ABSTRACT

An input device (101) according to the present invention includes a touch sensor (104) that detects contact, a display unit (103), a pressure detection unit (106) that detects pressure on the touch sensor (104), a memory unit (105) that stores indication information indicating existence of notification information, and a control unit (108) that controls the display unit (103) to display the indication information stored in the memory unit (105) when data based on pressure on the touch sensor (104) becomes equal to or greater than a threshold, thereby displays indication information in accordance with a user's desire.

15 Claims, 5 Drawing Sheets

(56) References Cited

U.S. PATENT DOCUMENTS

| | | | |
|---|---|---|---|
| 2008/0303799 A1* | 12/2008 | Schwesig et al. | 345/173 |
| 2009/0140996 A1 | 6/2009 | Takashima et al. | |
| 2009/0201260 A1* | 8/2009 | Lee et al. | 345/173 |
| 2009/0267909 A1* | 10/2009 | Chen et al. | 345/173 |
| 2010/0017710 A1* | 1/2010 | Kim et al. | 715/702 |
| 2010/0020035 A1* | 1/2010 | Ryu | G06F 3/04883 345/173 |
| 2010/0079395 A1* | 4/2010 | Kim et al. | 345/173 |
| 2010/0099394 A1* | 4/2010 | Hainzl | 455/418 |
| 2010/0146439 A1* | 6/2010 | Ariga | G06F 3/0488 715/810 |
| 2010/0159995 A1* | 6/2010 | Stallings et al. | 455/566 |
| 2010/0162182 A1* | 6/2010 | Oh | G06F 3/04883 715/863 |
| 2010/0248688 A1* | 9/2010 | Teng et al. | 455/411 |
| 2010/0248689 A1* | 9/2010 | Teng et al. | 455/411 |
| 2010/0269040 A1* | 10/2010 | Lee | 715/702 |
| 2011/0080367 A1* | 4/2011 | Marchand | G06F 1/3215 345/174 |
| 2011/0088086 A1* | 4/2011 | Swink et al. | 726/7 |
| 2011/0102345 A1* | 5/2011 | Kim et al. | 345/173 |
| 2011/0205182 A1* | 8/2011 | Miyazawa et al. | 345/174 |
| 2011/0248839 A1* | 10/2011 | Kwok | G06F 3/016 340/407.2 |
| 2011/0248929 A1* | 10/2011 | Tong | G06F 3/016 345/173 |
| 2012/0105358 A1* | 5/2012 | Momeyer | G06F 3/0414 345/174 |
| 2012/0223890 A1* | 9/2012 | Borovsky et al. | 345/173 |

FOREIGN PATENT DOCUMENTS

| | | |
|---|---|---|
| JP | 2004-159206 A | 6/2004 |
| JP | 2005-072945 A | 3/2005 |
| JP | 2007-312405 A | 11/2007 |
| JP | 2009-134473 A | 6/2009 |

* cited by examiner

INPUT DEVICE

CROSS-REFERENCE TO RELATED APPLICATION

This application claims priority to and the benefit of Japanese Patent Application No. 2011-027424 filed Feb. 10, 2011, the entire contents of which are incorporated herein by reference.

TECHNICAL FIELD

The present invention relates to an input device and to an input device that displays indication information indicating the existence of notification information.

BACKGROUND

In recent years, many input devices such as mobile phone terminals are provided with a variety of applications for phone calls, sending and receiving mail, schedule management, setting of alarms, and the like. For these input devices, a function has been proposed to increase usability for the user by displaying indication information, in order to provide the user with a message, on the standby screen (for example, see Patent Literature 1). Indication information refers to information to indicate to the user a missed call, the reception of mail, a registered schedule event when the set time is reached, a set alarm when the time is reached, and the like.

In the input device disclosed in Patent Literature 1, when there is a missed call, for example, indication information ("missed call") indicating the existence of a message for the user is displayed on the standby screen, as illustrated in FIG. 5(a). When the user selects the indication information, notification information ("Time: 14:38, Caller: Mr. A, Length of call: 25 seconds"), which is detailed information related to the indication information, is displayed as illustrated in FIG. 5(b). While the user can also confirm the notification information by selecting to display a list of received calls from the standby screen, the input device recited in Patent Literature 1 allows for confirmation of the notification information by selecting the indication information.

CITATION LIST

Patent Literature 1: JP200572945A

SUMMARY

However, with an input device, such that indication information is automatically displayed on the standby screen when a message for the user exists (in the example above, the existence of a missed call), and when the indication information is selected, the notification information is displayed. Therefore, a user who is attempting not to confirm the message but rather to use an application not related to the message might receive the impression of poor usability.

Accordingly, the present invention has been conceived in light of the above considerations regarding conventional techniques, and is to provide an input device that displays indication information in accordance with a user's desire.

In order to achieve the above object, an input device according to a first aspect of the present invention includes a touch sensor configured to detect contact; a display unit; a pressure detection unit configured to detect pressure on the touch sensor; a memory unit configured to store indication information indicating existence of notification information; and a control unit configured to control the display unit to display the indication information stored in the memory unit when data based on pressure on the touch sensor becomes equal to or greater than a threshold.

The input device preferably further includes a tactile sensation providing unit configured to provide a tactile sensation to a contacting object in contact with the touch sensor, and when the data based on pressure on the touch sensor becomes equal to or greater than the threshold, the control unit preferably controls the tactile sensation providing unit to provide the tactile sensation to the contacting object in contact with the touch sensor.

When a position with respect to the touch sensor is a predetermined position, the control unit preferably controls the display unit to display the indication information.

When the display unit is displaying the indication information, and the touch sensor detects contact at a position corresponding to the indication information, the control unit preferably controls the display unit to display notification information corresponding to the indication information.

The control unit preferably sets, when a plurality of types of indication information exist, a plurality of thresholds corresponding to the types of indication information, and when the data based on pressure on the touch sensor becomes equal to or greater than any one of the plurality of thresholds, controls the display unit to display the indication information corresponding to the one of the plurality of thresholds.

The plurality of types of indication information preferably include first indication information and second indication information, and the control unit preferably sets a first threshold corresponding to the first indication information to be a value smaller than a second threshold corresponding to the second indication information, and when the first indication information is being displayed on the display unit, and the data based on pressure on the touch sensor becomes equal to or greater than the second threshold, controls the display unit to display the second indication information together with the first indication information.

The plurality of types of indication information preferably include first indication information and second indication information, and the control unit preferably sets a first threshold corresponding to the first indication information to be a value smaller than a second threshold corresponding to the second indication information, and when the first indication information is being displayed on the display unit, and the data based on pressure on the touch sensor becomes equal to or greater than the second threshold, controls the control unit to display the second indication information instead of the first indication information.

When the contact on the touch sensor satisfies a predetermined trajectory condition while the indication information is being displayed on the display unit, the control unit preferably controls the display unit to hide display of the indication information being displayed on the display unit.

The control unit preferably sets a deletion threshold larger than the threshold and, when the contact on the touch sensor satisfies the predetermined trajectory condition while data based on pressure on the touch sensor is equal to or greater than the deletion threshold, controls the display unit to hide display of the indication information.

The control unit preferably sets a deletion maximum threshold larger than any other threshold and, when the contact on the touch sensor satisfies the predetermined trajectory condition while the data based on pressure on the touch sensor is equal to or greater than the deletion maximum threshold, controls the display unit to hide display of the indication information being displayed on the display unit.

When the data based on pressure on the touch sensor becomes less than the threshold while the display unit is displaying a standby screen, the control unit preferably causes the display unit to display a menu screen instead of the standby screen.

According to the present invention, the input device with the above structure displays indication information on the display unit when data based on pressure on the touch sensor becomes equal to or greater than a threshold. Hence, the user can display indication information as desired and confirm the indication information by adjusting the data based on pressure.

BRIEF DESCRIPTION OF DRAWINGS

The present invention will be further described below with reference to the accompanying drawings, wherein.

DESCRIPTION OF EMBODIMENTS

With reference to the drawings, the following describes an embodiment of the present invention.

Figure 1:
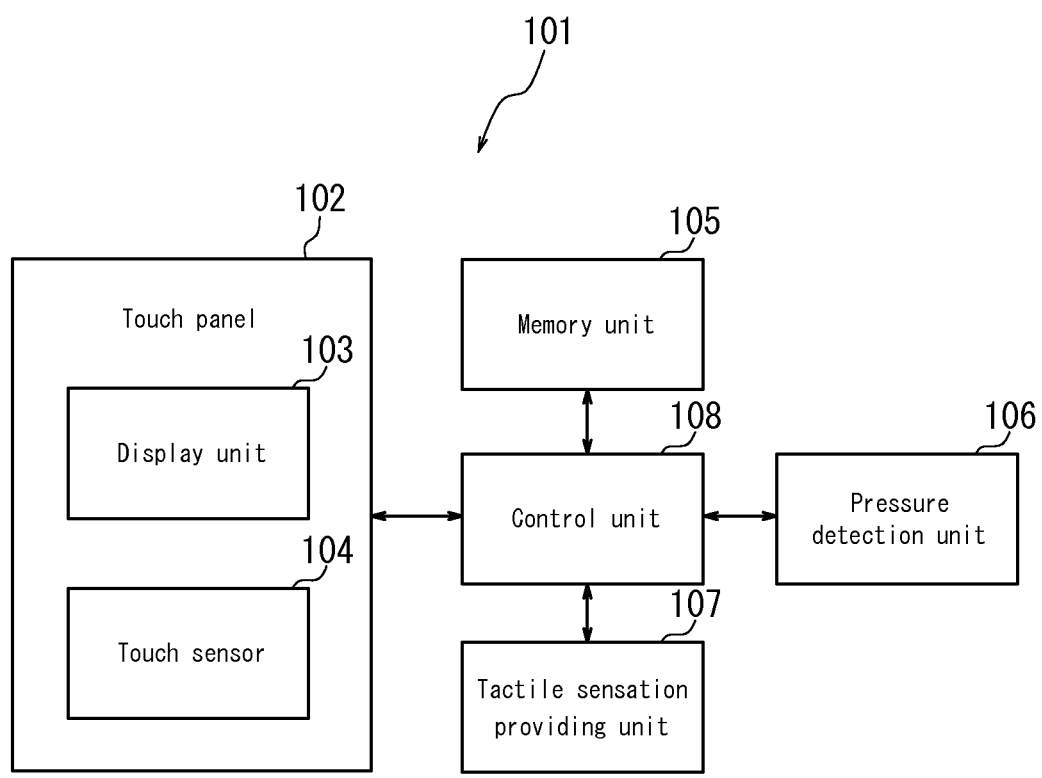
FIG. 1 is a functional block diagram schematically illustrating the configuration of an input device according to an embodiment of the present invention.

FIG. 1 is a functional block diagram schematically illustrating the configuration of an input device according to an embodiment of the present invention. Examples of an input device 101 according to the present invention include a mobile phone terminal, a Personal Digital Assistant (PDA), a portable music player, a portable television, a portable game device, a bank Automated Teller Machine (ATM), and a station ticket vending machine.

The input device 101 includes a touch panel 102, a memory unit 105, a pressure detection unit 106, a tactile sensation providing unit 107, and a control unit 108. The touch panel 102 is provided with a display unit 103 and a touch sensor 104.

The display unit 103 performs display corresponding to an application provided on the input device 101 and display of indication information and notification information. The display unit 103 is, for example, configured using a liquid crystal display panel, an organic EL display panel, or the like.

Indication information is information indicating the existence of notification information, which is a message for the user. For example, indication information indicates a missed call, the reception of mail, a registered schedule event when the set time is reached, an alarm registered in an alarm application when the time is reached, the result of a scheduled video recording application, the result of scheduled transmission of mail, reception of broadcast information for Broadcast/Multicast Services (BCMCS), the existence of a memo to be displayed on the standby screen (a shortcut icon for a pre-registered schedule event, mail, a bookmark, or other such item), or the like. As the indication information, the display unit 103 for example displays "missed call", "new mail received", or the like.

The notification information indicates the specific content of the indication information. As the notification information for the indication information "missed call", the display unit 103 for example displays "Time: 14:38, Caller: Mr. A, Length of call: 25 seconds". As the notification information for the indication information "new mail received", the display unit 103 for example displays "Time: 18:30, Sender: Mr. A, Content: Do you have plans tomorrow?".

The display unit 103 can also display a key or button for input of a character. When the display unit 103 displays a key or button, the input device 101 need not be provided with a mechanical key or button for input of a character.

The touch sensor 104 detects contact by the user's finger, a stylus pen, or the like (contacting object) and is configured using a well-known type, such as a resistive film type, a capacitive type, an optical type, or the like. Upon detecting contact, the touch sensor 104 transmits contact position information on the position of the contact to the control unit 108. Note that in order for the touch sensor 104 to detect contact, it is not essential for the contacting object to physically contact the touch sensor 104. For example, if the touch sensor 104 is an optical type, the touch sensor 104 detects the position at which an infrared ray on the touch sensor 104 is blocked by a finger, a stylus pen, or the like, and therefore the contacting object need not contact the touch sensor 104.

The memory unit 105 stores a variety of information related to contact (for example, contact position information), a pressure condition, a position condition and a predetermined trajectory condition on the touch panel 102, and the like. The memory unit 105 also functions as a work memory and the like. The pressure condition is a standard for the control unit 108 to display indication information on the display unit 103 or a standard to delete indication information displayed on the display unit 103, for example such as data based on pressure on the touch sensor 104 being equal to or greater than a threshold related to pressure.

The position condition is a standard for the control unit 108 to display indication information on the display unit 103, for example such as the contact position on the touch sensor 104 being a predetermined position. It should be understood that contact to a predetermined position is not limited strictly to contact to that position, but rather includes, for example, contact that traverses a predetermined position due to a slide operation to slide the contacting object (drag operation). The slide operation refers to an operation to move the contact position while contact is maintained.

Furthermore, the predetermined trajectory condition is a standard for the control unit 108 to delete indication information displayed on the display unit 103, for example such as the contact trajectory of a slide operation by the contacting object matching a predetermined trajectory, or the end of a trajectory being a predetermined position. The trajectory refers not only to the trajectory of a single finger, but also to the trajectory of a pinch-in operation to pinch with two fingers and the trajectory of a pinch-out operation to push two fingers apart.

Note that the contact trajectory matching a predetermined trajectory is not limited strictly to a complete match. For example, if an error range is determined in advance and the contact trajectory is within the error range, the contact trajectory can be considered to match the predetermined trajectory.

The control unit 108 can freely set the threshold related to pressure, the predetermined position, and the predetermined trajectory. Therefore, the control unit 108 can also set a plurality of thresholds related to pressure and predetermined trajectories in accordance with a plurality of types of indication information. For example, the control unit 108 can set a threshold related to pressure for indication information related to a phone call to be smaller (or larger) than the threshold related to pressure for indication information related to mail. The control unit 108 can also set the predetermined trajectory corresponding to deletion of indication information related to a phone call to be triangular and the predetermined trajectory corresponding to deletion of indication information related to mail to be rectangular.

The pressure detection unit 106 detects pressure on the touch sensor 104 and is, for example, configured using a strain gauge sensor, an element such as a piezoelectric element, or the like that experiences a change in physical or electrical characteristics (strain, resistance, voltage, or the like) in response to pressure. When the pressure detection unit 106 is configured using a piezoelectric element, for example, the magnitude of the voltage (voltage value), which is an electrical characteristic, of the piezoelectric element changes in accordance with the magnitude of the load (force) of the pressure on the touch sensor 104 (or the speed at which the magnitude of the load (force) changes (acceleration)). The pressure detection unit 106 notifies the control unit 108 of the magnitude of the voltage (voltage value, hereinafter referred to simply as data). The control unit 108 acquires the data by the pressure detection unit 106 notifying the control unit 108 of the data, or by the control unit 108 detecting data relating to the piezoelectric element in the pressure detection unit 106. The control unit 108 thus acquires data based on pressure on the touch sensor 104. In other words, the control unit 108 acquires data based on pressure from the pressure detection unit 106.

The tactile sensation providing unit 107 vibrates the touch sensor 104 to provide a tactile sensation to the user's finger, a stylus pen, or the like (contacting object) in contact with the touch sensor 104 and is, for example, configured using a vibrating element such as a piezoelectric element or the like. The provided tactile sensation may be any sort of vibration, and the control unit 108 can set the frequency, phase (wavelength), amplitude, and waveform appropriately in accordance with the tactile sensation to be provided. For example, the control unit 108 can set a different tactile sensation for each type of indication information. The control unit 108 can also appropriately set the number of tactile sensations provided to the contacting object. For example, the control unit 108 can set the number of tactile sensations provided to the contacting object to match the number of pieces of indication information.

The tactile sensation providing unit 107 can also provide the contacting object with not only a simple vibration, but also a hard tactile sensation like the click felt when pressing a mechanical key (realistic clicking sensation). By setting a condition for providing a tactile sensation (for example, the load of the pressure on the touch panel 102 exceeding 1 newton (N) (correspondingly, the data based on pressure on the touch panel 102 (voltage) exceeding 1 V)), it is possible to stimulate the user's sense of pressure until the condition is satisfied, and once the condition is satisfied, to stimulate the user's sense of touch by the tactile sensation providing unit 107 vibrating the touch sensor 104. In this way, by stimulating the user's sense of pressure and sense of touch, the user can be provided with a hard, click-like tactile sensation. The touch sensor 104 itself is not physically displaced like a mechanical key when pressed, but providing a tactile sensation as above to the touching object (contacting object) allows the user to obtain a realistic clicking sensation as when operating a mechanical key. As a result, the user can operate the touch sensor 104, which normally provides no feedback by contact, without a sense of awkwardness. A hard, click-like tactile sensation can be achieved by, for example, providing one cycle of a sine wave or one cycle of a rectangular wave at 140 Hz to 500 Hz.

When the pressure detection unit 106 and the tactile sensation providing unit 107 are both configured using a piezoelectric element, the pressure detection unit 106 and the tactile sensation providing unit 107 can be configured to share the same piezoelectric element. The reason is that a piezoelectric element generates voltage when pressure is applied and deforms upon application of voltage. Note that the tactile sensation providing unit 107 can be configured to vibrate the touch sensor 104 indirectly by causing the input device 101 to vibrate via a vibration motor (eccentric motor) or the like, or to vibrate the touch sensor 104 directly by providing a piezoelectric element in the touch sensor 104.

The control unit 108 controls and manages the entire input device 101, starting with the functional blocks thereof. The control unit 108 can be configured by software running on any suitable processor, such as a central processing unit (CPU), or by dedicated processors specific to each process (such as digital signal processors (DSP)). Processing by the control unit 108 is described below in detail with reference to FIGS. 2, 3, and 4.

Figure 2:
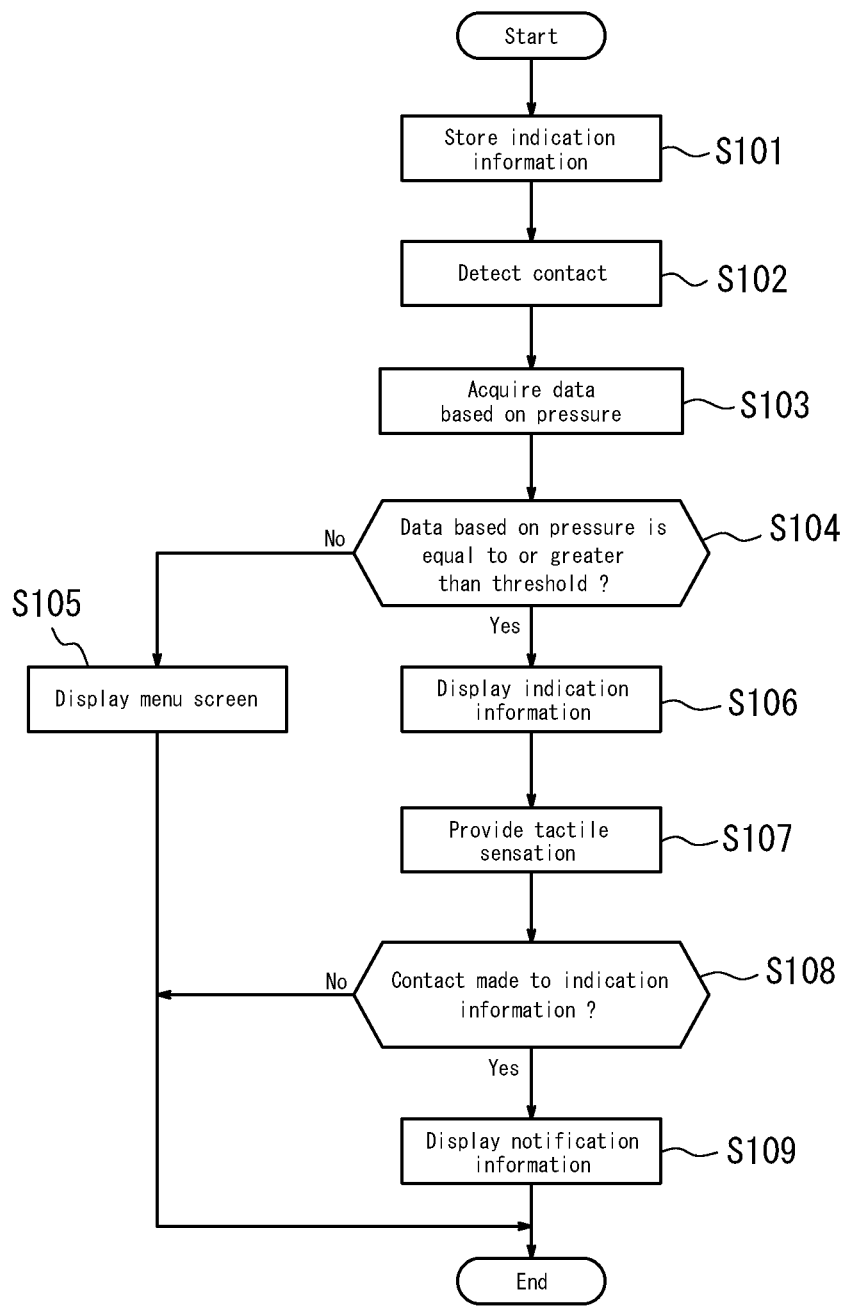
FIG. 2 is a flowchart illustrating processing by the input device in FIG. 1.
Figure 3:
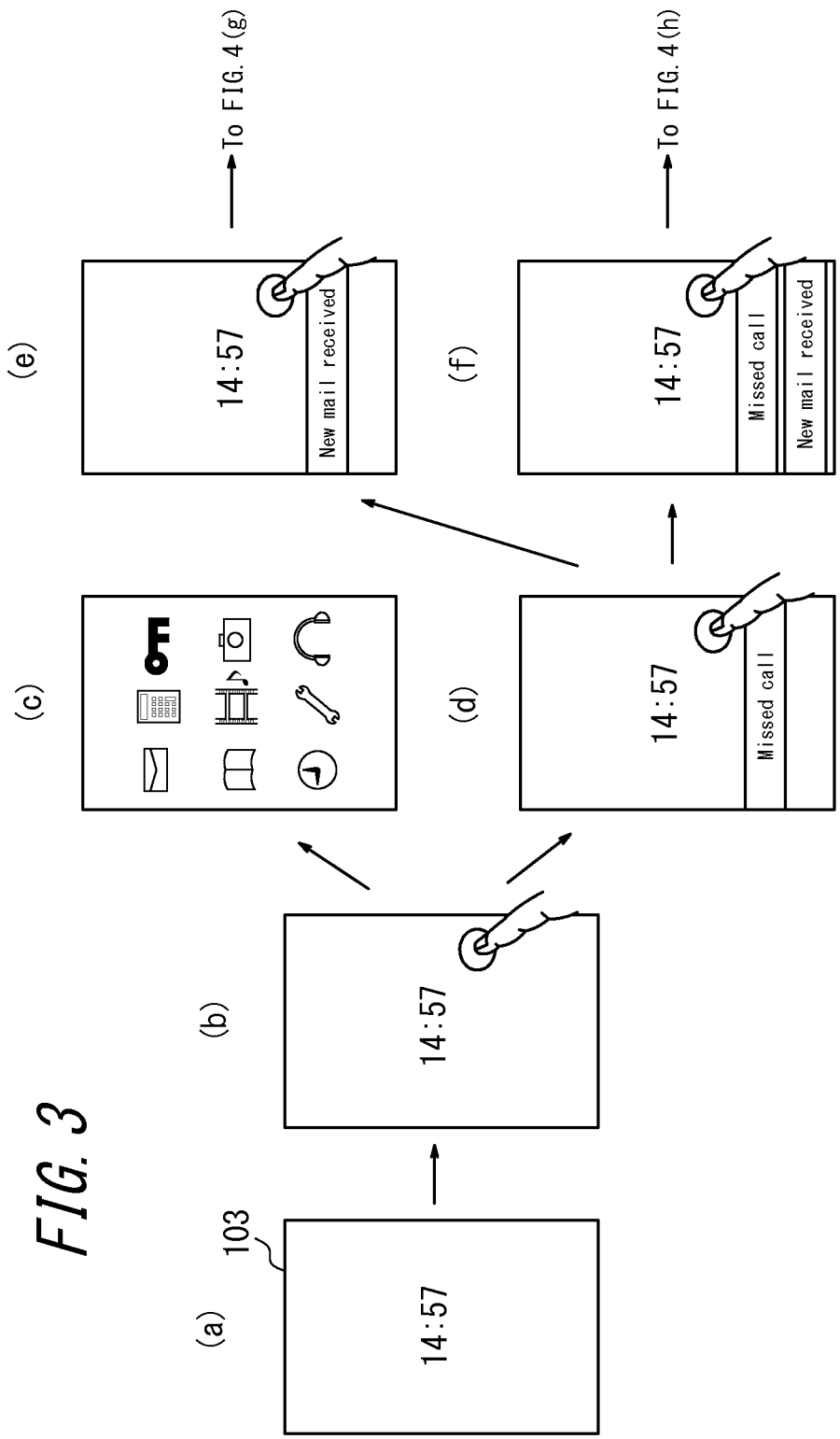
FIG. 3 graphically illustrates processing by the input device in FIG. 1.
Figure 4:
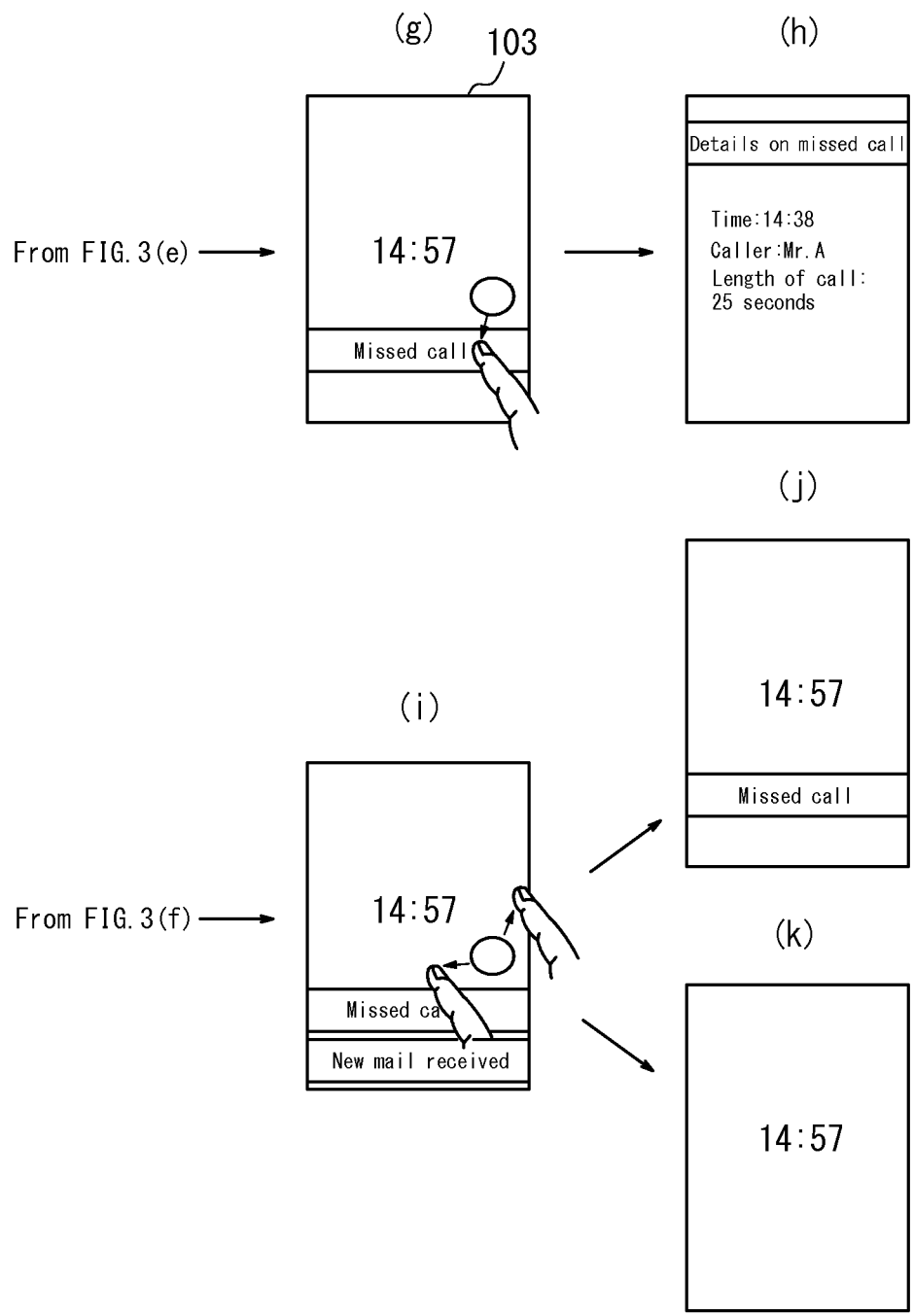
FIG. 4 graphically illustrates processing by the input device in FIG. 1.
Figure 5:
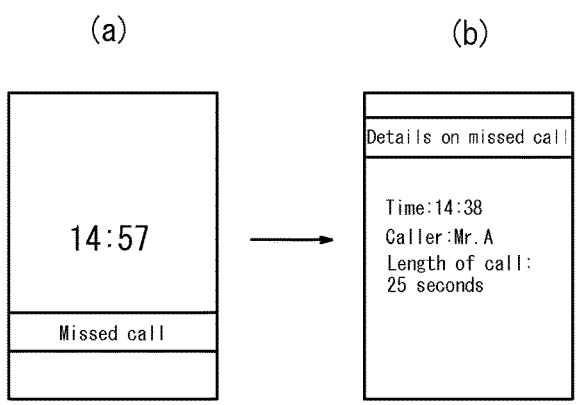
FIG. 5 graphically illustrates processing by a related input device.

Next, a method by which the input device 101 causes the display unit 103 to display indication information is described with reference to FIGS. 2, 3, and 4. FIG. 2 is a flowchart illustrating processing by the input device in FIG. 1. FIGS. 3 and 4 graphically illustrate processing by the input device in FIG. 1. Below, it is assumed that the display unit 103 is displaying a standby screen as with a state (a) of FIG. 3. In the present embodiment, it is also assumed that the control unit 108 has set a first threshold related to pressure, which is a display standard for first indication information related to a phone call, and a second threshold related to pressure, which is a display standard for second indication information related to mail (second threshold related to pressure>first threshold related to pressure). Furthermore, in the present embodiment, it is assumed that the control unit 108 has set a third threshold related to pressure, which is a deletion standard for the second indication information (deletion threshold related to pressure) (third threshold related to pressure>second threshold related to pressure) and a deletion maximum threshold related to pressure, which is a deletion standard for all of the pieces of indication information. Note that the deletion maximum threshold related to pressure is a threshold larger than any other threshold related to pressure.

First, when a message for the user is generated, the control unit 108 stores indication information related to the message in the memory unit 105 (step S101). In the present embodiment, it is assumed that a missed call and reception of mail have occurred. Accordingly, the control unit 108 stores the information "missed call" in the memory unit 105 as the first indication information and stores the information "new mail received" in the memory unit 105 as the second indication information.

When a contacting object such as the user's finger, stylus pen, or the like contacts the touch panel 102 (state (b) of FIG. 3), the touch sensor 104 detects the contact (step S102). At this point, the control unit 108 can change the display of the display unit 103 so as to allow for recognition of the contacted position (state (b) of FIG. 3). For example, the control unit 108 can cause the display unit 103 to display a key or button in accordance with the contacted position. When contact by the contacting object is detected, the control unit 108 can also cause the display unit 103 to display a key or button at a predetermined position and only perform the following indication information display processing upon further contact to the predetermined position.

The control unit 108 starts to acquire data based on pressure on the touch face of the touch sensor 104 from the pressure detection unit 106 at the point at which the contacting object such as the user's finger, stylus pen, or the like contacts the touch sensor 104 (step S103).

The control unit 108 can compare the data based on pressure acquired from the pressure detection unit 106 with a threshold related to pressure stored in the memory unit 105 (step S104). When the data based on pressure is less than the threshold related to pressure (step S104: No), the control unit 108 can cause the display unit 103 to display a menu screen instead of the standby screen (step S105 and state (c) of FIG. 3). The menu screen is a screen displaying a list of applications usable on the input device 101, and the user can select and launch an application from the menu screen.

When the data based on pressure is equal to or greater than the first threshold related to pressure (step S104: Yes), the control unit 108 causes the display unit 103 to display the first indication information corresponding to the first threshold related to pressure, i.e. the information "missed call" (step S106 and state (d) of FIG. 3). Note that the control unit 108 can also cause the display unit 103 to display the indication information when, in addition to the pressure condition, the contact position of the contact detected by the touch sensor 104 is a predetermined position. In the present embodiment, after display of the indication information, the control unit 108 continues to cause the display unit 103 to display the indication information even when the data based on pressure becomes less than the threshold related to pressure.

When the data based on pressure further becomes equal to or greater than the second threshold related to pressure (step S104: Yes), the control unit 108 can cause the display unit 103 to display the second indication information corresponding to the second threshold related to pressure, i.e. the information "new mail received", instead of the first indication information (step S106 and state (e) of FIG. 3). Alternatively, as with a state (f) of FIG. 3, the control unit 108 can also cause the display unit 103 to display the second indication information together with the first indication information.

When displaying the indication information, the control unit 108 can control the tactile sensation providing unit 107 to provide a tactile sensation to the contacting object in contact with the touch sensor 104 (step S107). The control unit 108 can also provide a different tactile sensation in correspondence with the display of different indication information. For example, the control unit 108 can cause the tactile sensation providing unit 107 to provide a first tactile sensation (for example, a vibration) in correspondence with the first threshold related to pressure and a second tactile sensation (for example, a stronger or longer vibration) in correspondence with the second threshold related to pressure. In other words, by provision of the first tactile sensation, the user can recognize that a call has been missed. By provision of the second tactile sensation, the user can also recognize that mail has been received.

Furthermore, the control unit 108 can control the tactile sensation providing unit 107 to change the number of times a tactile sensation is provided in accordance with the number of missed calls or number of received mail messages. For example, when two mail messages are received, the control unit 108 can control the tactile sensation providing unit 107 to provide the first tactile sensation twice (two vibrations).

After providing the tactile sensation, the control unit 108 determines whether contact has been made to the position corresponding to the indication information displayed on the display unit 103 (step S108). Contact to the position corresponding to the indication information refers not only to new contact differing from the contact in step S102 for display of the indication information, but also includes contact to the position corresponding to the indication information by a slide operation continuous with the contact in step S102 (state (g) of FIG. 4).

Upon the touch sensor 104 detecting contact to the position corresponding to the indication information (step S108: Yes), the control unit 108 can cause the display unit 103 to display the notification information corresponding to the contacted indication information, i.e. "Time: 14:38, Caller: Mr. A, Length of call: 25 seconds" (step S109, state (h) of FIG. 4).

After display of the first and second indication information on the display unit 103 in step S106, suppose that while the indication information is being displayed, contact related to data based on pressure equal to or greater than the third threshold related to pressure satisfies a predetermined trajectory condition (for example, that the contact trajectory be a trajectory of a pinch-out operation) (state (i) of FIG. 4). The control unit 108 can then control the display unit 103 so as to hide display of the second indication information being displayed on the display unit 103 (state (j) of FIG. 4). At this point, the control unit 108 can also delete the second indication information stored in the memory unit 105. Note that when a fourth threshold related to pressure, which is a deletion standard for the first indication information (deletion threshold related to pressure) (fourth threshold related to pressure>first threshold related to pressure) is set, the control unit 108 can hide display of the first indication information upon contact related to data based on pressure equal to or greater than the fourth threshold related to pressure satisfying a predetermined trajectory condition (for example, that the contact trajectory be triangular). Further note that regardless of the data based on pressure, the control unit 108 can control the display unit 103 to hide display of indication information corresponding to a predetermined trajectory condition when contact satisfying the predetermined trajectory condition is performed while either or both of the first and second indication information are displayed on the display unit 103. When the trajectory conditions corresponding to a plurality of pieces of indication information are the same, the control unit 108 hides display of the pieces of indication information displayed on the display unit 103 upon contact satisfying a predetermined trajectory condition.

After display of the first and second indication information in step S106, suppose that while the indication information is being displayed on the display unit 103, contact related to data based on pressure equal to or greater than the deletion maximum threshold related to pressure satisfies a predetermined trajectory condition (that the contact trajectory be a trajectory of a pinch-out operation) (state (i) of FIG. 4). The control unit 108 can then control the display unit 103 so as to hide display of all of the pieces of indication information being displayed on the display unit 103 (state (k) of FIG. 4). At this point, the control unit 108 can also delete all of the pieces of indication information stored in the memory unit 105.

In the present embodiment, the control unit 108 of the input device 101 thus causes the display unit 103 to display the indication information stored in the memory unit 105 when data based on pressure on the touch sensor 104 becomes equal to or greater than a threshold related to pressure. In other words, the input device 101 of the present embodiment does not display the indication information automatically, but rather displays the indication information based on pressure by the user. Accordingly, the user can adjust the pressure so as to cause indication information to be displayed on the input device 101 only when the user wishes to confirm the indication information.

Furthermore, in the present embodiment, the control unit 108 can control the tactile sensation providing unit 107 to provide a tactile sensation to the contacting object in contact with the touch sensor 104 when data based on pressure on the touch sensor 104 becomes equal to or greater than a threshold related to pressure. Without confirming the display of the display unit 103, the user can thus confirm the existence of indication information via the provision of a tactile sensation.

Furthermore, in the present embodiment, the control unit 108 can cause the display unit 103 to display indication information when the position of contact detected by the touch sensor 104 is a predetermined position. In other words, the indication information is displayed on the display unit 103 when both the position condition and the pressure condition are satisfied. A third party who is unaware of the predetermined position cannot confirm the indication information. Misuse by a third party can thus be prevented.

Furthermore, the present embodiment includes a plurality of types of indication information, i.e. first indication information related to a phone call and second indication information related to mail. In this case, the control unit 108 can set a first threshold related to pressure and a second threshold related to pressure in correspondence with types of indication information (second threshold related to pressure>first threshold related to pressure), and when the data based on pressure on the touch sensor 104 becomes equal to or greater than either of the first threshold and second threshold related to pressure, the control unit 108 can cause the display unit 103 to display the indication information for the corresponding threshold related to pressure. In this way, the user can confirm the indication information by causing the indication information to be displayed on the display unit 103 by type.

In the present embodiment, when the first indication information is being displayed on the display unit 103, and the data based on pressure on the touch sensor 104 becomes equal to or greater than the second threshold related to pressure, the control unit 108 can cause the second indication information to be displayed together with the first indication information. In this way, the user can confirm the indication information by causing a plurality of pieces of indication information to be displayed on the display unit 103 gradually.

In the present embodiment, when the first indication information is being displayed on the display unit 103, and the data based on pressure on the touch sensor 104 becomes equal to or greater than the second threshold related to pressure, the control unit 108 can cause the display unit 103 to display the second indication information instead of the first indication information. In this way, the user can confirm the indication information by causing the indication information to be displayed on the display unit 103 gradually, type by type.

In the present embodiment, when contact on the touch sensor 104 satisfies a predetermined trajectory condition while the first or the second indication information is being displayed on the display unit 103, the control unit 108 can control the display unit 103 so as to hide display of the indication information being displayed on the display unit 103. In this way, by adjusting the contact trajectory, the user can hide display of the indication information type by type.

In the present embodiment, when the control unit 108 sets a third or fourth threshold related to pressure (deletion threshold related to pressure) that is larger than a first or second threshold related to pressure, and contact on the touch sensor 104 satisfies a predetermined trajectory condition while data based on pressure on the touch sensor 104 is equal to or greater than the third or fourth threshold related to pressure, then the control unit 108 can control the display unit 103 to hide display of the first or second indication information being displayed on the display unit 103 and also delete the first or second indication information stored in the memory unit 105. In this way, by adjusting the pressure and the contact trajectory, the user can hide display of the indication information and delete the indication information from the memory unit 105 type by type.

In the present embodiment, when the control unit 108 sets a deletion maximum threshold related to pressure larger than any other threshold related to pressure, and contact on the touch sensor 104 satisfies a predetermined trajectory condition while data based on pressure on the touch sensor 104 is equal to or greater than the deletion maximum threshold related to pressure, then the control unit 108 can control the display unit 103 to hide display of the indication information being displayed on the display unit 103. In this way, the user can hide display of all pieces of indication information at once by adjusting the pressure and the contact trajectory. Note that when data based on pressure is equal to or greater than the deletion maximum threshold related to pressure and contact satisfies a predetermined trajectory condition, the control unit 108 can also delete all of the pieces of indication information stored in the memory unit 105, so that indication information is completely deleted from the input device 101.

In the present embodiment, when data based on pressure on the touch sensor 104 becomes less than the first threshold related to pressure while the display unit 103 is displaying the standby screen, the control unit 108 can cause the display unit 103 to display the menu screen instead of the standby screen. As a result, a user who does not wish to confirm the indication information but rather to launch an application not related to the indication information can cause the indication information not to be displayed by adjusting the pressure. The user can thus launch a desired application without performing the unnecessary operation of deleting displayed indication information.

Although the present invention has been described by way of an embodiment with reference to the accompanying drawings, it is to be noted that various changes and modifications will be apparent to those skilled in the art. Therefore, such changes and modifications are to be understood as included within the scope of the present invention.

For example, the functions and the like included in the various members, units, steps, and the like may be reordered in any logically consistent way. Furthermore, units, steps, and the like may be combined into one or divided.

In the above description of an embodiment of the present invention, a display of indication information on the standby screen is described, but in the present invention, the display screen of the indication information is not limited to being the standby screen. For example, the present invention may be applied to display of indication information on a screen displayed during mail composition or during a game.

In the above description of an embodiment of the present invention, display of the indication information is described as being hidden when a pressure condition and a trajectory condition are satisfied, but the condition for hiding display of the indication information is not limited to the pressure condition and the trajectory condition. For example, after the indication information is displayed, the control unit may hide display of the indication information when the contacting object is released from the touch sensor and new contact is made to a predetermined position of the touch sensor.

In the above description of an embodiment of the present invention, the indication information is described as being displayed when a pressure condition is satisfied, but when a security code for display of the indication information is set in advance, the control unit can cause the display unit to display a security code input screen when the pressure condition is satisfied.

In the above description of an embodiment of the present invention, the technical meaning of expressions such as, for example, "equal to or greater than" the threshold related to pressure or "less than" the threshold related to pressure is not necessarily precise. In accordance with the specifications of the input device, these expressions encompass the cases both of including and of not including the value representing the standard. For example, "equal to or greater than" the threshold related to pressure may refer not only to the case of the data based on pressure reaching the threshold related to pressure, but also the case of exceeding the threshold related to pressure. Furthermore, "less than" the threshold related to pressure, for example, may refer not only to the case of the data based on pressure falling below the threshold related to pressure, but also the case of reaching the threshold related to pressure, i.e. of being equal to or less than the threshold related to pressure.

The "display unit" and the "touch sensor" in the above description of an embodiment of the present invention may be configured as an integrated device by, for example, providing a common substrate with the functions of both the display unit and the touch sensor. An example of a device thus integrating the functions of both the display unit and the touch sensor is a liquid crystal panel having a matrix of pixel electrodes, with a plurality of photoelectric conversion elements, such as photodiodes, regularly mixed therein. This device receives touch input from a pen at a desired position on the panel display, and while displaying images with the liquid crystal panel structure, the device can detect the touch position by light from a backlight for liquid crystal display being reflected by the tip of the pen and received by surrounding photoelectric conversion elements.

REFERENCE SIGNS LIST

101: Input device
102: Touch panel
103: Display unit
104: Touch sensor
105: Memory unit
106: Pressure detection unit
107: Tactile sensation providing unit
108: Control unit

The invention claimed is:
1. An input device comprising:
a touch screen sensor configured to detect contact;
a display;
a pressure detector configured to detect pressure on the touch screen sensor;
a memory configured to store indication information indicating existence of notification information that is not yet displayed; and
a controller configured to control the display to display a standby screen prior to detecting pressure on the touch screen sensor, wherein
the controller is configured to control the display to change the display from the standby screen to display the indication information stored in the memory when data based on pressure on the touch screen sensor becomes equal to or greater than a threshold, regardless of a position of the touch screen sensor where the pressure is applied,
the controller is configured to control the display to change the display from the standby screen to display a menu without displaying the indication information when the data based on pressure on the touch screen sensor is less than the threshold,
the notification information is displayed when the pressure is applied to a position of the indication information after the indication information is displayed,
the notification information includes a display of detailed information related to the indication information, and the indication information includes a display of a summary of information related to the notification information,
the indication information can be displayed without first displaying the menu, and the menu can be displayed without first displaying the indication information, and
the menu is a display of a plurality of icons corresponding with a plurality of respective functions of the input device, where each of the plurality of icons is configured to be pressed by the user in order to execute one of the plurality of functions.
2. The input device according to claim 1, further comprising a tactile sensation provider configured to provide a tactile sensation to a contacting object in contact with the touch screen sensor, wherein
when the data based on pressure on the touch screen sensor becomes equal to or greater than the threshold, the controller controls the tactile sensation provider to provide the tactile sensation to the contacting object in contact with the touch screen sensor.
3. The input device according to claim 1, wherein when a position with respect to the touch screen sensor is a predetermined position, the controller controls the display to display the indication information.
4. The input device according to claim 1, wherein when the display is displaying the indication information, and the touch screen sensor detects contact at a position corresponding to the indication information, the controller controls the display to display notification information corresponding to the indication information.
5. The input device according to claim 1, wherein the controller
sets, when a plurality of types of indication information exist, a plurality of thresholds corresponding to the types of indication information, and
when the data based on pressure on the touch screen sensor becomes equal to or greater than any one of the plurality of thresholds, controls the display to display the indication information corresponding to the one of the plurality of thresholds.

6. The input device according to claim 5, wherein the plurality of types of indication information include
first indication information and second indication information, and
the controller
sets a first threshold corresponding to the first indication information to be a value smaller than a second threshold corresponding to the second indication information, and
when the first indication information is being displayed on the display, and the data based on pressure on the touch screen sensor becomes equal to or greater than the second threshold, controls the display to display the second indication information together with the first indication information.

7. The input device according to claim 5, wherein the plurality of types of indication information include
first indication information and second indication information, and
the controller
sets a first threshold corresponding to the first indication information to be a value smaller than a second threshold corresponding to the second indication information, and
when the first indication information is being displayed on the display, and the data based on pressure on the touch screen sensor becomes equal to or greater than the second threshold, controls the controller to display the second indication information instead of the first indication information.

8. The input device according to claim 5, wherein when the contact on the touch screen sensor satisfies a predetermined trajectory condition while the indication information is being displayed on the display, the controller controls the display to hide display of the indication information being displayed on the display.

9. The input device according to claim 8, wherein the controller sets a deletion maximum threshold larger than any other threshold and, when the contact on the touch screen sensor satisfies the predetermined trajectory condition while the data based on pressure on the touch screen sensor is equal to or greater than the deletion maximum threshold, controls the display to hide display of the indication information being displayed on the display.

10. The input device according to claim 1, wherein when the contact on the touch screen sensor satisfies a predetermined trajectory condition while the indication information is being displayed on the display, the controller controls the display to hide display of the indication information being displayed on the display.

11. The input device according to claim 10, wherein the controller sets a deletion threshold larger than the threshold and, when the contact on the touch screen sensor satisfies the predetermined trajectory condition while the data based on pressure on the touch screen sensor is equal to or greater than the deletion threshold, controls the display to hide display of the indication information.

12. The input device according to claim 1, wherein when the data based on pressure on the touch screen sensor becomes less than the threshold while the display is displaying a standby screen, the controller causes the display to display the menu instead of the standby screen.

13. The input device according to claim 1, wherein the indication information relates to a call and/or a mail.

14. The input device according to claim 1, wherein the controller is further configured
to control the display to display the indication information stored in the memory after the notification information is generated when the data based on pressure on the touch screen sensor becomes equal to or greater than the threshold,
to control the display to display the menu when the data based on pressure on the touch screen sensor is not equal to or greater than the threshold, and
to display the notification information when the displayed indication information is selected.

15. An input device comprising:
a touch screen sensor configured to detect contact;
a display;
a pressure detector configured to detect pressure on the touch screen sensor;
a memory configured to store indication information indicating existence of notification information that is not yet displayed; and
a controller configured to control the display to display a standby screen prior to detecting pressure on the touch screen sensor, wherein
the controller is configured to control the display to change the display from the standby screen to display the indication information stored in the memory when data based on pressure on the touch screen sensor becomes equal to or greater than a threshold, regardless of a position of the touch screen sensor where the pressure is applied,
the controller is configured to control the display to change the display from the standby screen to display a menu without displaying the indication information when the data based on pressure on the touch screen sensor is less than the threshold,
the notification information is displayed when the pressure is applied to a position of the indication information after the indication information is displayed,
the notification information includes a display related to the indication information,
both the indication information and notification information comprise information relating to an event that occurred on the input device while a user was not using the input device or making contact with the input device, and, after the event occurred, the user, upon touching the device, is given an option to either review the indication and notification information regarding the event or proceed directly to the menu for operating various functions of the input device without reviewing the event, depending on whether the data based on pressure the user applies to the touch screen sensor of the input device is above or below the threshold, and
the menu is a display of a plurality of icons corresponding with a plurality of respective functions of the input device, where each of the plurality of icons is configured to be pressed by the user in order to execute one of the plurality of functions.

* * * * *